(12) United States Patent
Park et al.

(10) Patent No.: US 10,165,857 B2
(45) Date of Patent: Jan. 1, 2019

(54) ROLLER UNIT HAVING INTEGRATED FASTENING PORTION

(71) Applicant: SEGOS CO., LTD., Incheon (KR)

(72) Inventors: Yoon Sig Park, Seoul (KR); Jae Won Kim, Incheon (KR)

(73) Assignee: SEGOS CO., LTD., Incheon (KR)

( * ) Notice: Subject to any disclaimer, the term of this patent is extended or adjusted under 35 U.S.C. 154(b) by 231 days.

(21) Appl. No.: 15/115,654

(22) PCT Filed: Jan. 28, 2015

(86) PCT No.: PCT/KR2015/000902
§ 371 (c)(1),
(2) Date: Jul. 29, 2016

(87) PCT Pub. No.: WO2015/115792
PCT Pub. Date: Aug. 6, 2015

(65) Prior Publication Data
US 2017/0049227 A1 Feb. 23, 2017

(30) Foreign Application Priority Data

Jan. 29, 2014 (KR) .......... 10-2014-0011076
Jan. 29, 2014 (KR) .......... 10-2014-0011077
Dec. 1, 2014 (KR) .......... 10-2014-0169889

(51) Int. Cl.
*A47B 88/43* (2017.01)
*A47B 88/437* (2017.01)
(Continued)

(52) U.S. Cl.
CPC ........ *A47B 88/437* (2017.01); *A47B 88/0466* (2013.01); *B60B 33/00* (2013.01)

(58) Field of Classification Search
CPC ..... A47B 88/41; A47B 88/437; A47B 88/487; A47B 88/433; A47B 2210/0008;
(Continued)

(56) References Cited

U.S. PATENT DOCUMENTS 1,849,809 A * 3/1932 Showers .............. A47B 88/487
312/319.1
2,497,224 A * 2/1950 Laure .................... F16C 13/006
301/111.03

(Continued)

FOREIGN PATENT DOCUMENTS

DE 93 16 303 U1 1/1994
DE 44 45 304 A1 6/1996
(Continued)

OTHER PUBLICATIONS

International Search Report for PCT/KR2015/000902.
(Continued)

*Primary Examiner* — Jason L Vaughan
(74) *Attorney, Agent, or Firm* — The PL Law Group, PLLC

(57) ABSTRACT

A roller unit having an integrated fastening portion includes a supporting shaft fastened to a containing body or a containing main body that can slide and having first and second flanges formed in multi steps with different outer diameters, a rotating body rotatably fixed to a side of the supporting shaft, and a washer coupled to a side of the rotating body to surround and fix the second flange, thereby preventing separation of the supporting shaft and the rotating body. Therefore, it is possible to more conveniently combine the supporting shaft and the rotating body and to prevent separation of the supporting shaft and the rotating body, whereby is possible to improve various functions.

19 Claims, 16 Drawing Sheets

(51) Int. Cl.
*B60B 33/00* (2006.01)
*A47B 88/04* (2006.01)

(58) Field of Classification Search
CPC ...... A47B 2210/001; A47B 2210/0037; A47B 2210/0097
USPC .......................................................... 492/47
See application file for complete search history.

(56) References Cited

U.S. PATENT DOCUMENTS

| | | | | |
|---|---|---|---|---|
| 2,752,219 | A * | 6/1956 | Yonkers | A47B 88/487 312/323 |
| 2,786,726 | A | 3/1957 | Tarr | |
| 2,912,288 | A * | 11/1959 | Griswold, Jr. | F16H 7/18 384/54 |
| 3,099,501 | A * | 7/1963 | Hillson | A47B 88/487 312/334.21 |
| 3,119,137 | A * | 1/1964 | Schueler | B05C 17/02 15/230.11 |
| 3,361,489 | A * | 1/1968 | Gionet | F16C 13/006 16/97 |
| 3,418,026 | A * | 12/1968 | Philip | F16C 13/006 384/19 |
| 3,625,575 | A * | 12/1971 | Darnell | F16C 13/006 29/898.07 |
| 3,817,590 | A * | 6/1974 | Brezosky | A47L 15/507 312/228.1 |
| 3,829,191 | A * | 8/1974 | Jenkins | A47L 15/507 312/228.1 |
| 4,376,555 | A * | 3/1983 | Grass | A47B 88/437 384/18 |
| 4,549,774 | A * | 10/1985 | Bessinger | A47B 88/487 312/334.41 |
| 4,863,288 | A * | 9/1989 | Houck | A47B 88/437 312/334.6 |
| 4,979,262 | A * | 12/1990 | Lautenschlager | A47B 88/437 16/107 |
| 5,000,583 | A * | 3/1991 | Shen | F16C 13/006 384/19 |
| 5,090,820 | A * | 2/1992 | Lautenschlager | A47B 88/437 384/19 |
| 5,167,055 | A * | 12/1992 | Stoddart | B05C 17/02 15/230.11 |
| 9,033,437 | B2 * | 5/2015 | Klitzing | F25D 25/025 312/334.27 |
| 2004/0256333 | A1 * | 12/2004 | Buhlmeyer | A47L 15/507 211/41.9 |

FOREIGN PATENT DOCUMENTS

| | | |
|---|---|---|
| FR | 2.177.283 A7 | 11/1973 |
| JP | 08-084628 A | 4/1996 |
| KR | 10-2000-0012380 A | 3/2000 |
| KR | 10-0654951 B1 | 12/2006 |
| KR | 10-2007-0042347 A | 4/2007 |
| KR | 10-2008-0021284 A | 3/2008 |
| KR | 10-0822749 B1 | 4/2008 |
| KR | 10-0841057 B1 | 6/2008 |
| KR | 20-0452543 Y1 | 3/2011 |

OTHER PUBLICATIONS

European Search Report for EP15743749.2 from European patent office in a counterpart European patent application dated Mar. 21, 2018.

* cited by examiner

ROLLER UNIT HAVING INTEGRATED FASTENING PORTION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/000902, filed Jan. 28, 2015, which claims priority to the benefit of Korean Patent Application No. 10-2014-0011076 filed on Jan. 29, 2014, 10-2014-0011077 filed on Jan. 29, 2014, and 10-2014-0169889 filed on Dec. 1, 2014 in the Korean Intellectual Property Office, the entire contents of which are incorporated herein by reference.

The present invention relates to a roller unit having an integrated fastening portion. More particularly, the present invention relates to a roller unit having an integrated fastening portion. The roller unit includes: a supporting shaft fastened to a containing body or a containing main body that can slide, and having first and second flanges formed in multi steps with different outer diameters; a rotating body rotatably fixed to a side of the supporting shaft; and a washer coupled to a side of the rotating body to surround and fix the second flange, thereby preventing separation of the supporting shaft and the rotating body, or includes: a supporting shaft fastened to a containing body or a containing main body that can slide and having first and second flanges formed in multi steps with different outer diameters; and a rotating body having a fixing portion surrounding the second flange of the supporting shaft, or includes: a supporting shaft having first and second flanges having different outer diameters and fastened to a containing body or a containing main body that can slide; a roller rotatably coupled to a side of the supporting shaft; and a fixing body coupled to the coupling portions by coupling protrusions formed at positions corresponding to the coupling portions, thereby retaining the supporting shaft and the roller. Therefore, it is possible to more conveniently combine the supporting shaft and the rotating body, or the supporting shaft and the roller, and prevent separation of the supporting shaft and the rotating body, or the supporting shaft and the roller, whereby it is possible to improve various functions.

BACKGROUND ART

In general, a roller unit, which is a part having a cylindrical wheel rotatably coupled to a fastening member to reduce frictional resistance by changing sliding friction that is generated in sliding into roller friction, is applied in various fields to various products including furniture or a refrigerator having slidable containing bodies so that a user can smoothly open and close the containing bodies.

A roller unit according to the related art disclosed in Korean Patent No. 10-0822749 includes a wheel (rotary body), a support shaft, and a retainer coupled to a mounting portion of the support shaft to hold the wheel.

However, the roller unit disclosed in Korean Patent No. 10-0822749 necessarily requires a specific retainer for preventing separation of the wheel and the support shaft, so the manufacturing cost is high.

Further, the roller unit has a problem in that the wheel and the support shaft are separated due to corrosion at the portion plastically deformed for coupling the wheel and the support shaft.

There are Korean Patent Nos. 10-0841057 and 10-0654951 as prior art documents relating to such a roller unit.

SUMMARY

The present invention has been made in an effort to solve the problem and an object of the present invention is to provide a roller unit having an integrated fastening portion. The roller unit includes: a supporting shaft fastened to a containing body or a containing main body that can slide, and having first and second flanges formed in multi steps with different outer diameters; a rotating body rotatably fixed to a side of the supporting shaft; and a washer coupled to a side of the rotating body to surround and fix the second flange, thereby preventing separation of the supporting shaft and the rotating body, or includes: a supporting shaft fastened to a containing body or a containing main body that can slide and having first and second flanges formed in multi steps with different outer diameters; and a rotating body having a fixing portion surrounding the second flange of the supporting shaft, or includes: a supporting shaft having first and second flanges having different outer diameters and fastened to a containing body or a containing main body that can slide; a roller rotatably coupled to a side of the supporting shaft; and a fixing body coupled to the coupling portions by coupling protrusions formed at positions corresponding to the coupling portions, thereby retaining the supporting shaft and the roller. Therefore, it is possible to more conveniently combine the supporting shaft and the rotating body, or the supporting shaft and the roller, and prevent separation of the supporting shaft and the rotating body, or the supporting shaft and the roller, whereby it is possible to improve various functions.

A roller unit having an integrated fastening portion according to a first embodiment of the present invention includes: a supporting shaft having a first flange fastened to a containing body or a containing main body that can slide, formed in multi steps, and being in contact with the containing body or the containing main body, and a second flange having an outer diameter different from an outer diameter of the first flange and coupled to a rotating body by a washer; the rotating body rotatably coupled to a side of the supporting shaft and having a fixing groove for fixing the washer in a coupling direction of the supporting shaft; and the washer coupled to a side of the rotating body to surround and fix the second flange and having an insertion protrusion fitted in the fixing groove to surround the second flange, thereby preventing separation of the supporting shaft and the rotating body by retaining the supporting shaft and the rotating body.

The supporting shaft may have: a fastening portion having a predetermined length; the first flange disposed at a side of the fastening portion and being in contact with the containing body or the containing main body; the second flange making a single body with the first flange, having an outer diameter larger than an outer diameter of the first flange, and coupled to the rotating body by the washer; and the supporting portion protruding toward the rotating body at a side of the second flange and fitted in a hollow portion of the rotating body.

The rotating body may have: a hollow portion formed through a center of the rotating body; a supporting step formed at an end of the hollow portion in a coupling direction of the supporting shaft and supporting a surface, which faces the hollow portion, of the second flange; and the fixing groove formed at the supporting step and recessed in the coupling direction of the supporting shaft to fix the washer, in which the fixing groove has an inner diameter larger than the inner diameter of an opening.

A reinforcing groove recessed toward the hollow portion may be formed around an outer side of the rotating body, and a ring-shaped reinforcing member for preventing sliding and noise may be fitted in the reinforcing groove.

The washer may have: the insertion protrusion fitted in the fixing groove; a supporting protrusion protruding outward close to the insertion protrusion and having a surface, which faces the rotating body, being in contact with the supporting step; and a fixing portion bending inward toward the hollow portion at an opposite side to the supporting protrusion and having a fixing protrusion forming a receiving groove for fixing the second flange therein, in which the insertion protrusion may be fitted in the fixing groove with the second flange received in the receiving groove to prevent separation of the supporting shaft and the rotating body.

A roller unit having an integrated fastening portion according to a second embodiment of the present invention includes: a supporting shaft fastened to a containing body or a containing main body that can slide and having first and second flanges formed in multi steps with different outer diameters; and a rotating body having a fixing portion surrounding the second flange of the supporting shaft.

The supporting shaft may have: a fastening portion having a predetermined length; the first flange disposed at a side of the fastening portion and being in contact with the containing body or the containing main body; the second flange making a single body with the first flange, having an outer diameter larger than an outer diameter of the first flange, and coupled to the rotating body by the fixing portion; and the supporting portion protruding toward the rotating body at a side of the second flange and fitted in a hollow portion of the rotating body.

The rotating body may have: a hollow portion formed through a center of the rotating body; a supporting step formed at an end of the hollow portion in a coupling direction of the supporting shaft and supporting a surface, which faces the hollow portion, of the second flange; and fixing portions arranged around the hollow portion, ramified with regular intervals, and having a fixing protrusion bending toward the hollow portion at an end and forming a receiving groove for fixing the second flange therein.

A reinforcing groove recessed toward the hollow portion may be formed around an outer side of the rotating body, and a ring-shaped reinforcing member may be fitted in the reinforcing groove.

A roller unit having an integrated fastening portion according to a third embodiment of the present invention includes: a supporting shaft having first and second flanges formed in multi steps with different outer diameters to be fastened to a containing body or a containing main body that can slide; a roller rotatably coupled to a side of the supporting shaft and having coupling portions formed in a fastening direction with regular intervals therein; and a fixing body coupled to a side of the roller to surround and fix the second flange of the supporting shaft and coupled to the coupling portions by coupling protrusions formed at positions corresponding to the coupling portions, thereby retaining the supporting shaft and the roller.

The supporting shaft may have: a fastening portion having a predetermined length, fastened to the containing body or the containing main body, and having a thread around an outer side; the first flange formed at a side of the fastening portion and being in contact with the containing body or the containing main body; the second flange making a single body with the first flange, having an outer diameter larger than an outer diameter of the first flange, and coupled to the roller by the coupling portions; and a supporting protrusion protruding toward the roller at a side of the second flange and fitted in a hollow portion of the roller.

A tool groove may be further formed at an end of the supporting portion.

The roller may have: a hollow portion formed through a center of the roller; a supporting step formed on an outer side of an end of the hollow portion in a coupling direction of the supporting shaft and supporting a surface, which faces the hollow portion, of the second flange; and coupling portions formed outside the hollow portion and having a coupling hole for receiving the coupling protrusion of the fixing body, and the coupling portions may have: coupling holes arranged around the hollow portion, ramified with regular intervals, and receiving the coupling protrusions of the fixing body; and fixing protrusions protruding inward in the coupling holes, providing a fixing space for the coupling protrusions of the fixing body inserted in the coupling holes, having a fixing step preventing separation of the coupling protrusions and an inclined coupling guide curvedly formed at an end in a coupling direction of the supporting shaft and guiding the coupling protrusions to be coupled.

The fixing body may have: a flange supporting portion having a flange hole formed at a center thereon and receiving the first flange of the supporting shaft, and a flange seat recessed on a side of the flange hole so that the second flange of the supporting shaft is seated therein; and the coupling protrusions formed on a surface, which faces the roller, of the flange supporting portion, at the same positions and in the same numbers as the coupling holes of the roller, and inserted and locked by a fixing step in the coupling holes of the roller, thereby retaining the roller and the supporting shaft.

A fitting groove recessed toward the hollow portion may be formed around an outer side of the rotating body, and a ring-shaped rotation-assistant member may be fitted in the fitting groove.

As described above, a roller unit having an integrated fastening portion according to the present invention includes: a supporting shaft fastened to a containing body or a containing main body that can slide, and having first and second flanges formed in multi steps with different outer diameters; a rotating body rotatably fixed to a side of the supporting shaft; and a washer coupled to a side of the rotating body to surround and fix the second flange, thereby preventing separation of the supporting shaft and the rotating body, or includes: a supporting shaft fastened to a containing body or a containing main body that can slide and having first and second flanges formed in multi steps with different outer diameters; and a rotating body having a fixing portion surrounding the second flange of the supporting shaft, or includes: a supporting shaft having first and second flanges having different outer diameters and fastened to a containing body or a containing main body that can slide; a roller rotatably coupled to a side of the supporting shaft; and a fixing body coupled to the coupling portions by coupling protrusions formed at positions corresponding to the coupling portions, thereby retaining the supporting shaft and the roller. Therefore, it is possible to more conveniently combine the supporting shaft and the rotating body, or the supporting shaft and the roller, and prevent separation of the supporting shaft and the rotating body, or the supporting shaft and the roller, whereby it is possible to improve various functions.

DETAILED DESCRIPTION

Figure 1:
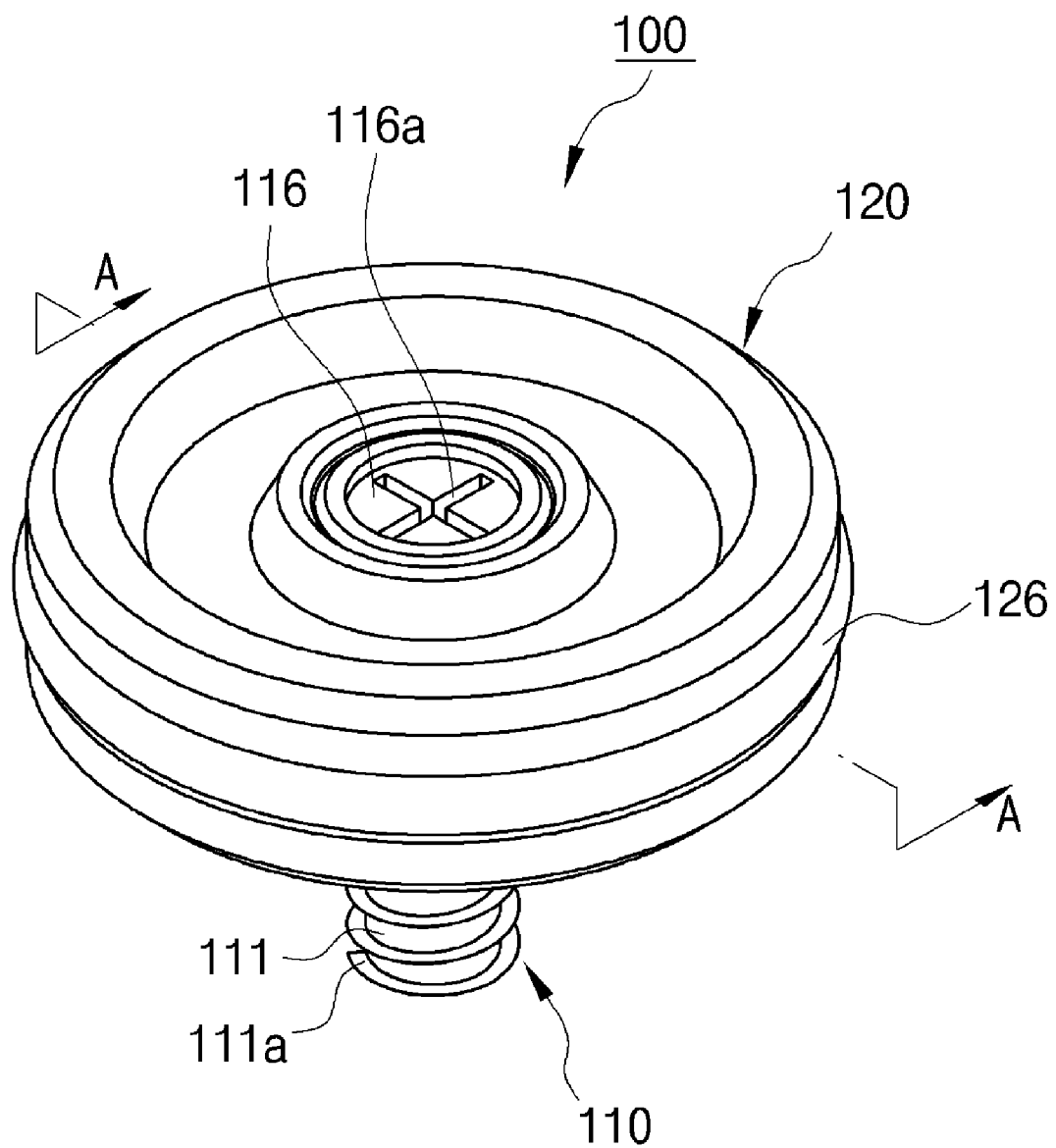
FIG. 1 is a perspective view showing a roller unit having an integrated roller unit according to a first embodiment of the present invention.
Figure 2:
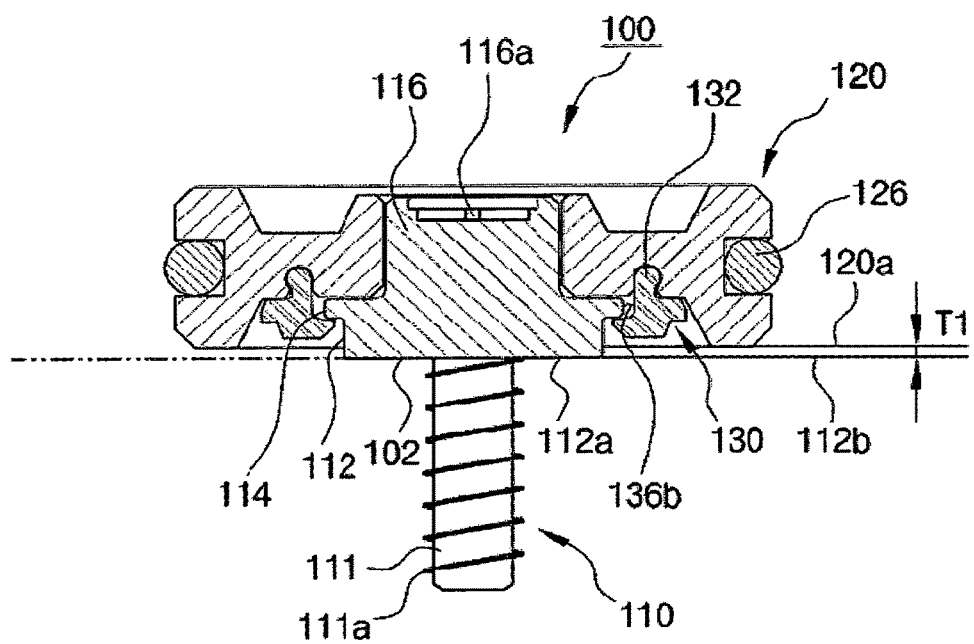
FIG. 2 is a cross-sectional view taken along line A-A of FIG. 1.
Figure 3:
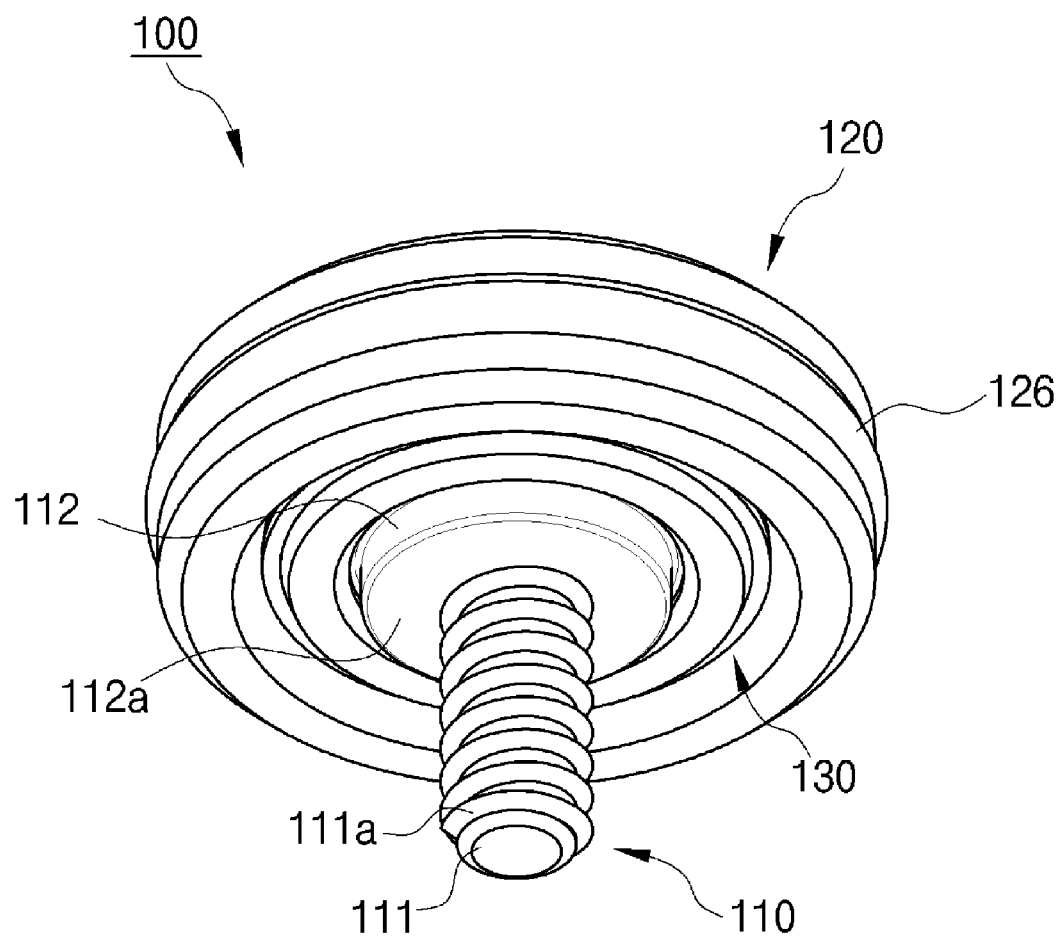
FIG. 3 is a perspective bottom view showing the roller unit having an integrated roller unit according to the first embodiment of the present invention.
Figure 4:
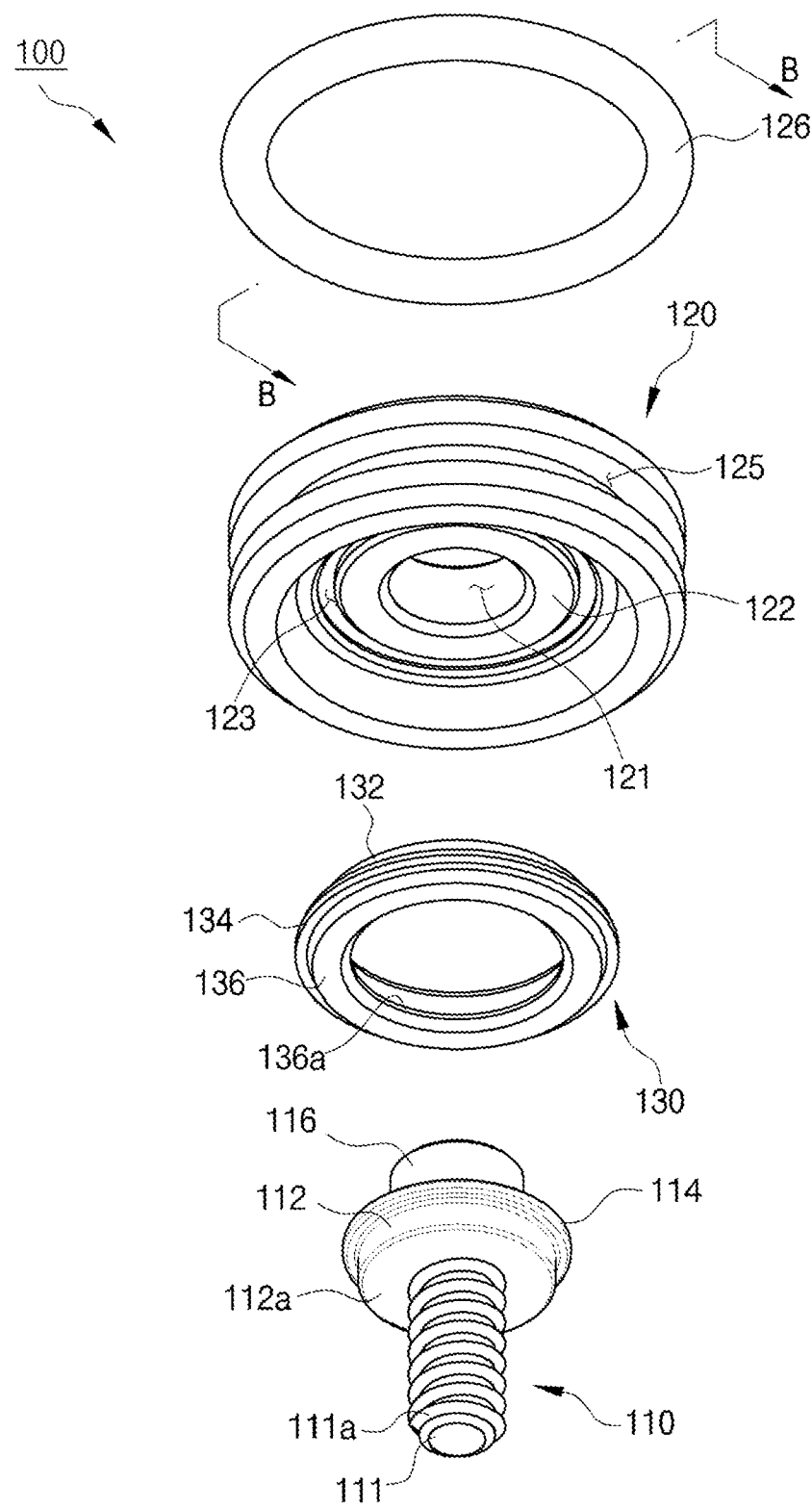
FIG. 4 is an exploded perspective view showing the roller unit having an integrated roller unit according to the first embodiment of the present invention.
Figure 5:
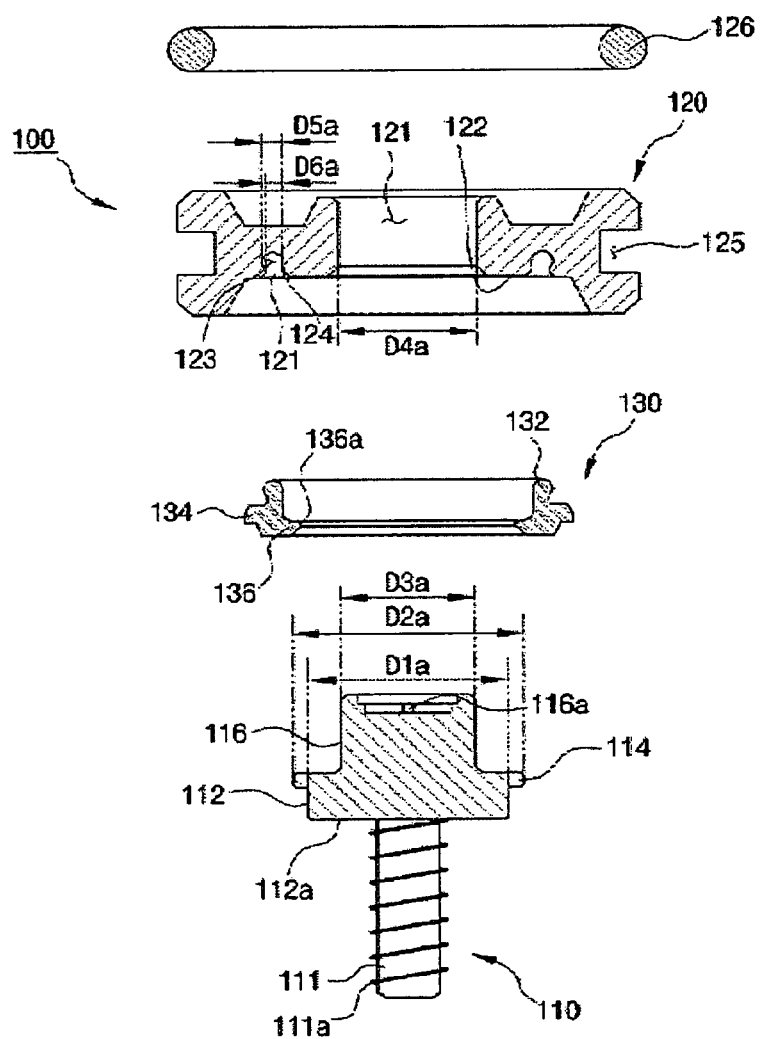
FIG. 5 is a cross-sectional view taken along line B-B of FIG. 4.
Figure 6:
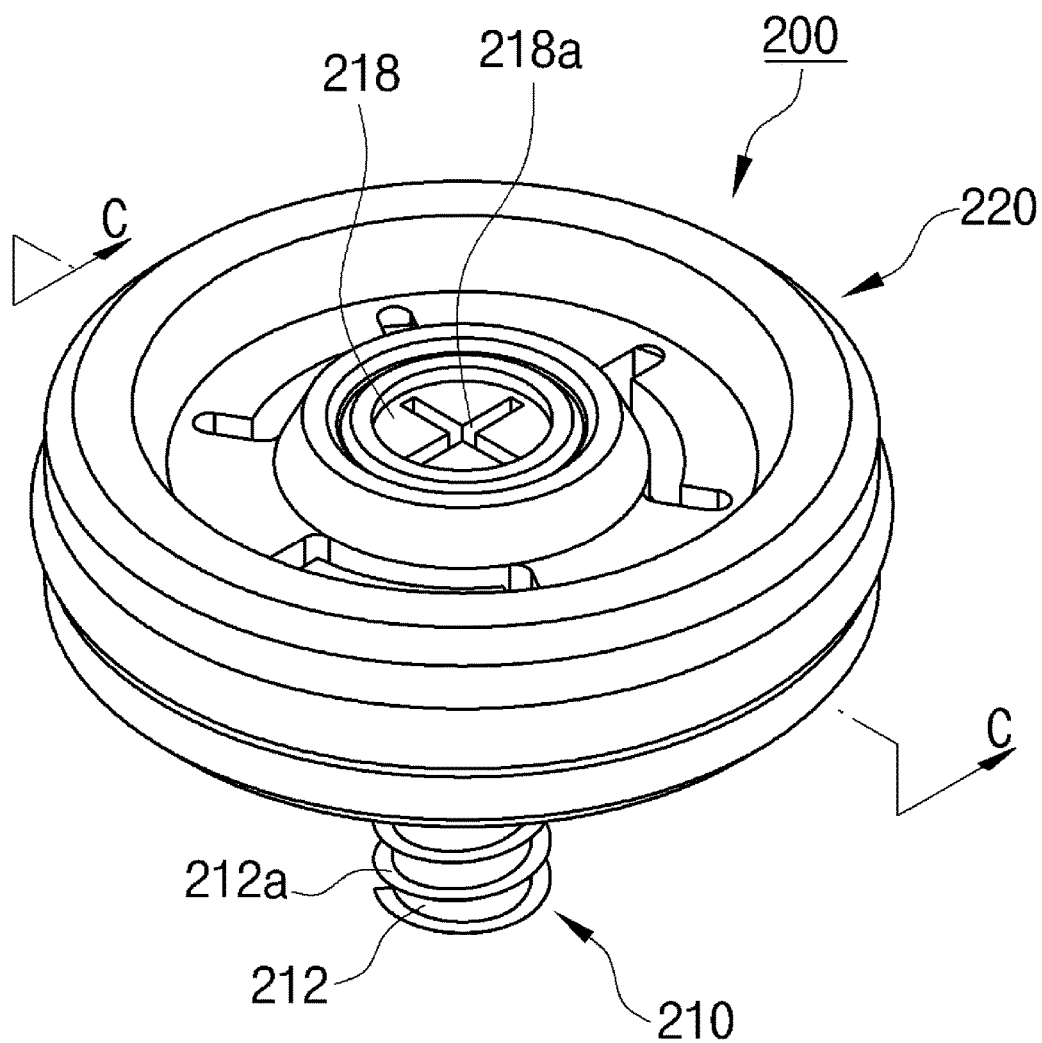
FIG. 6 is a perspective view showing a roller unit having an integrated roller unit according to a second embodiment of the present invention.
Figure 7:
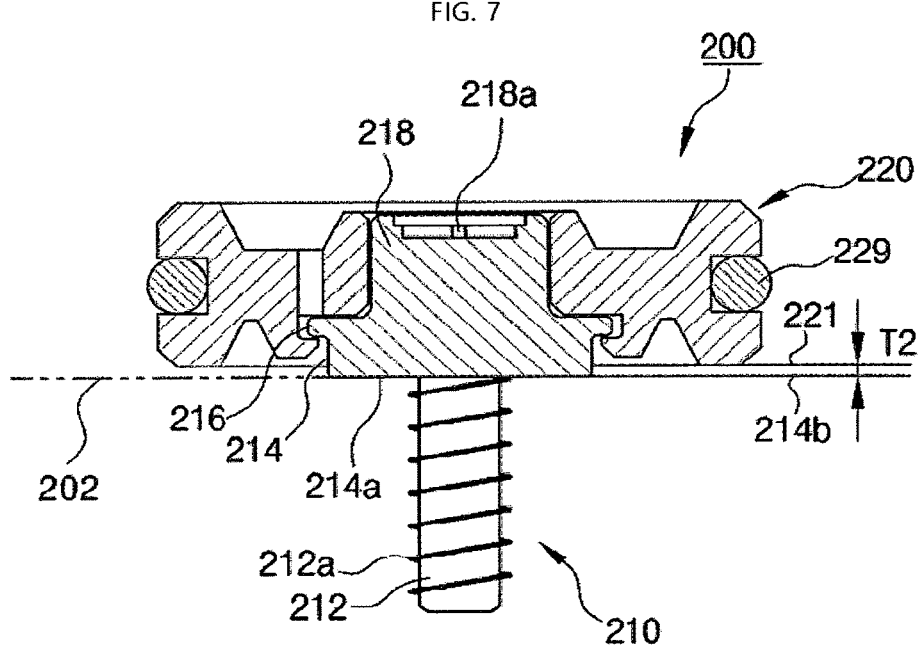
FIG. 7 is a cross-sectional view taken along line C-C of FIG. 6.
Figure 8:
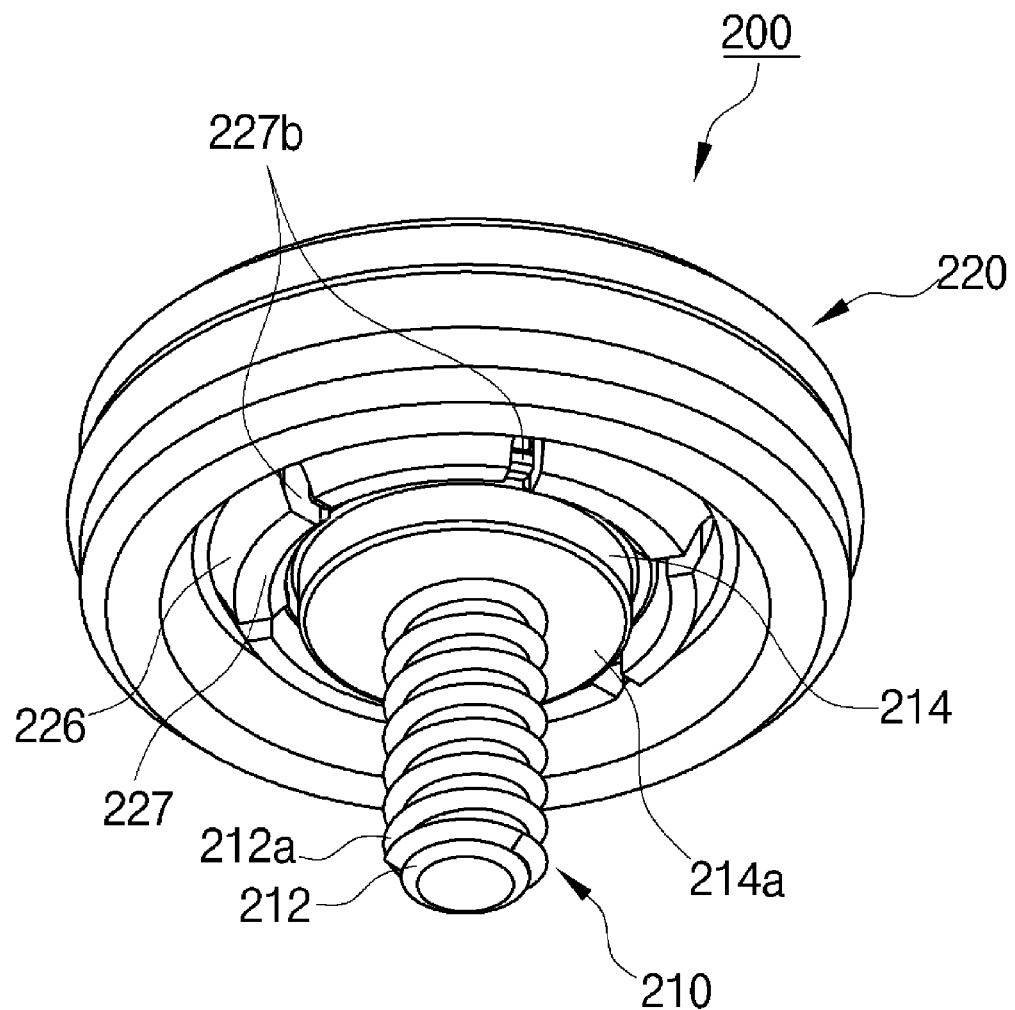
FIG. 8 is a perspective bottom view showing the roller unit having an integrated roller unit according to the second embodiment of the present invention.
Figure 9:
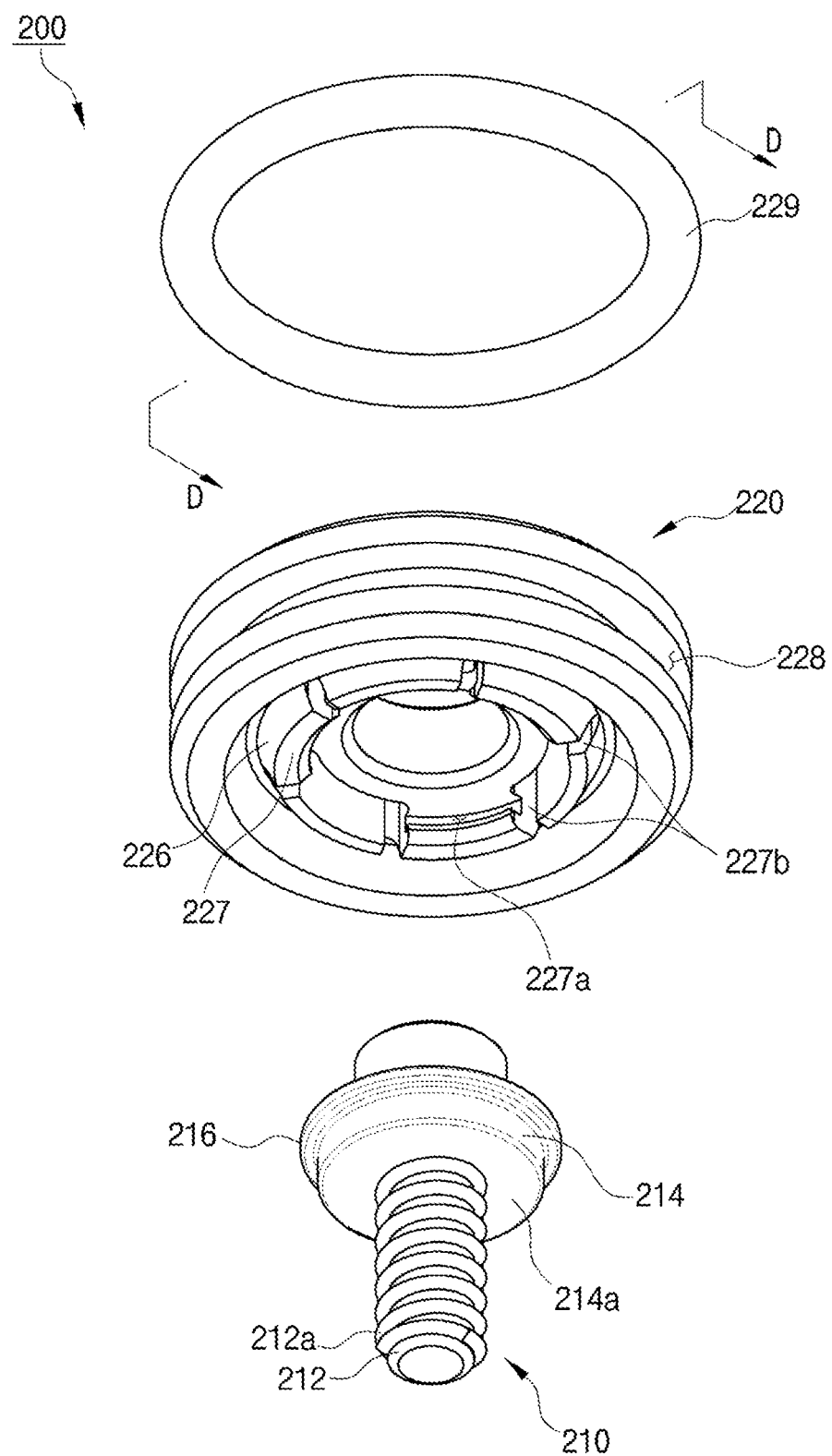
FIG. 9 is an exploded perspective view showing the roller unit having an integrated roller unit according to the second embodiment of the present invention.
Figure 10:
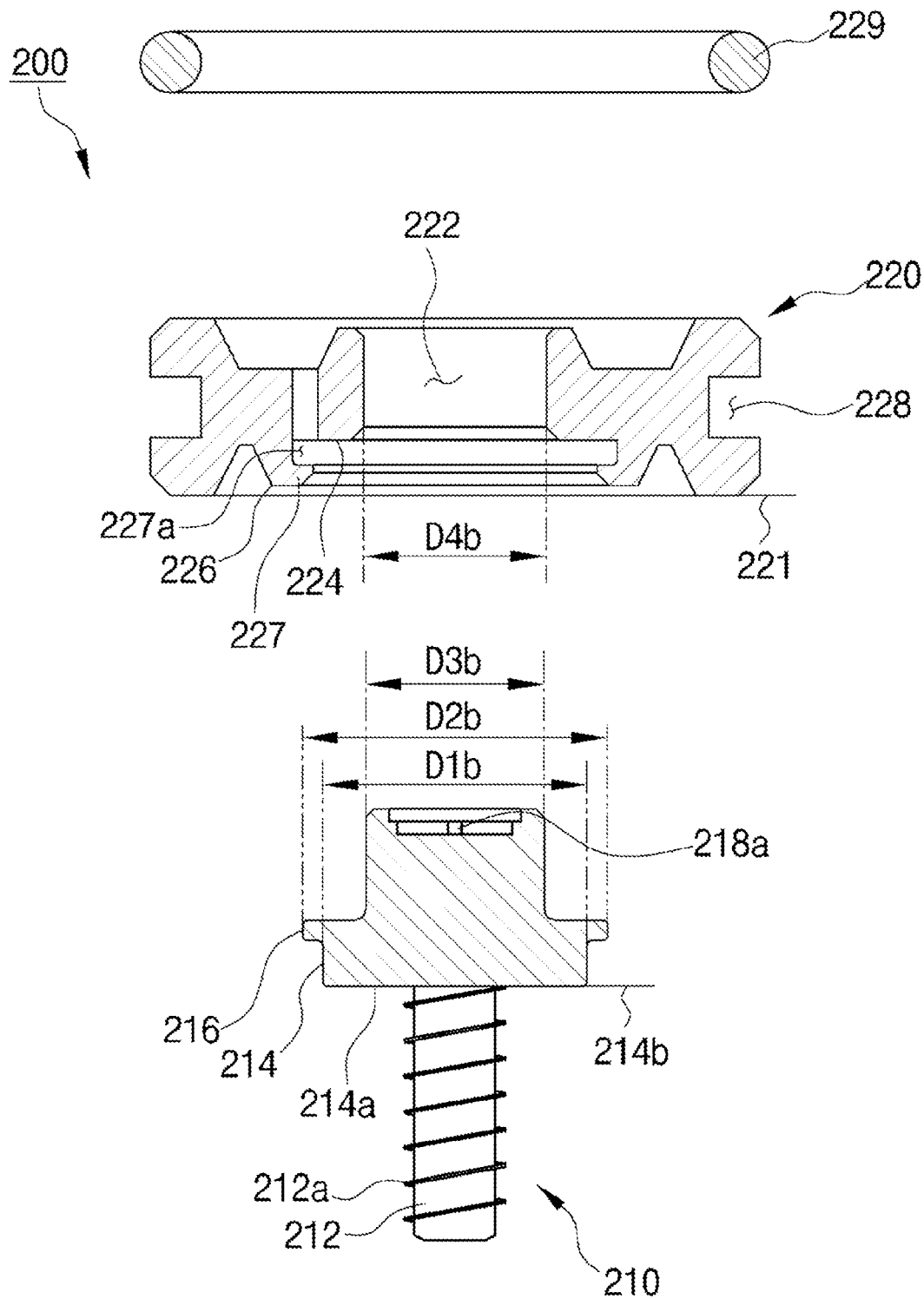
FIG. 10 is a cross-sectional view taken along line D-D of FIG. 9.
Figure 11:
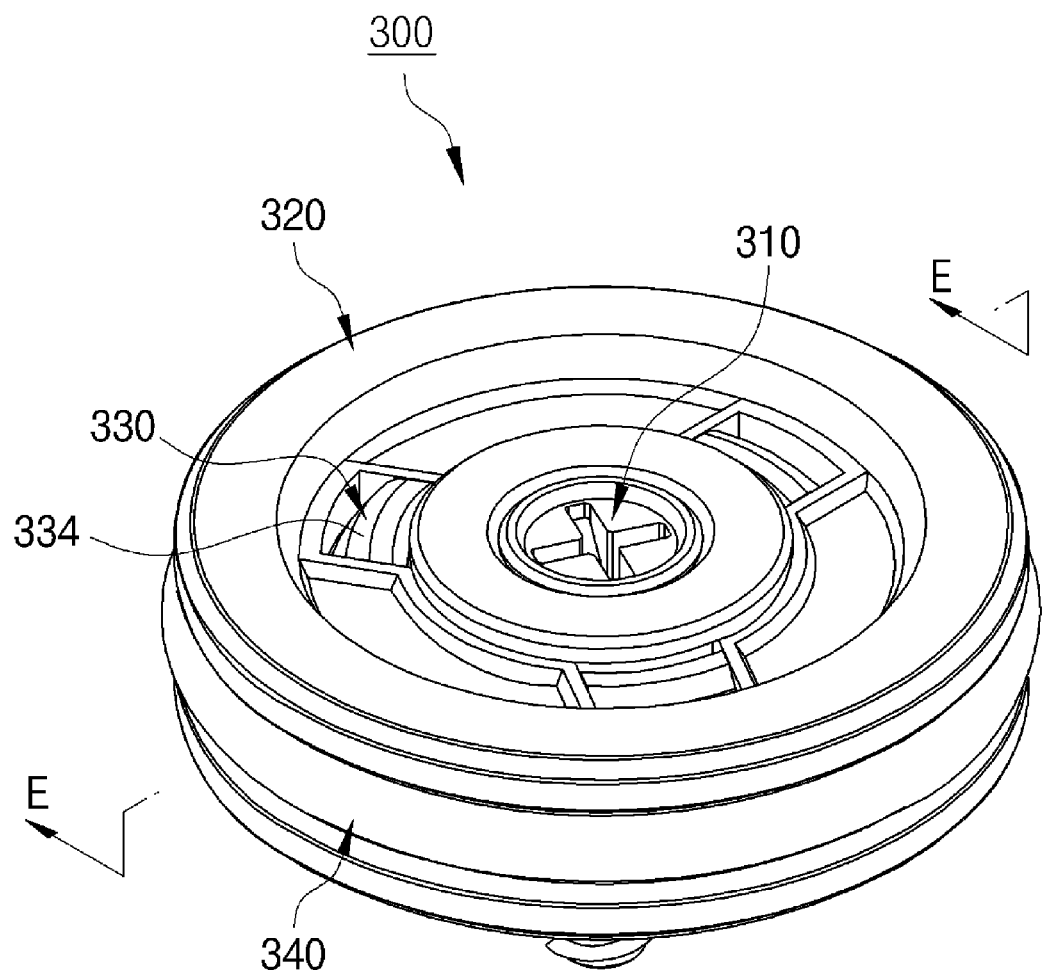
FIG. 11 is a perspective view showing a roller unit having an integrated roller unit according to a third embodiment of the present invention.
Figure 12:
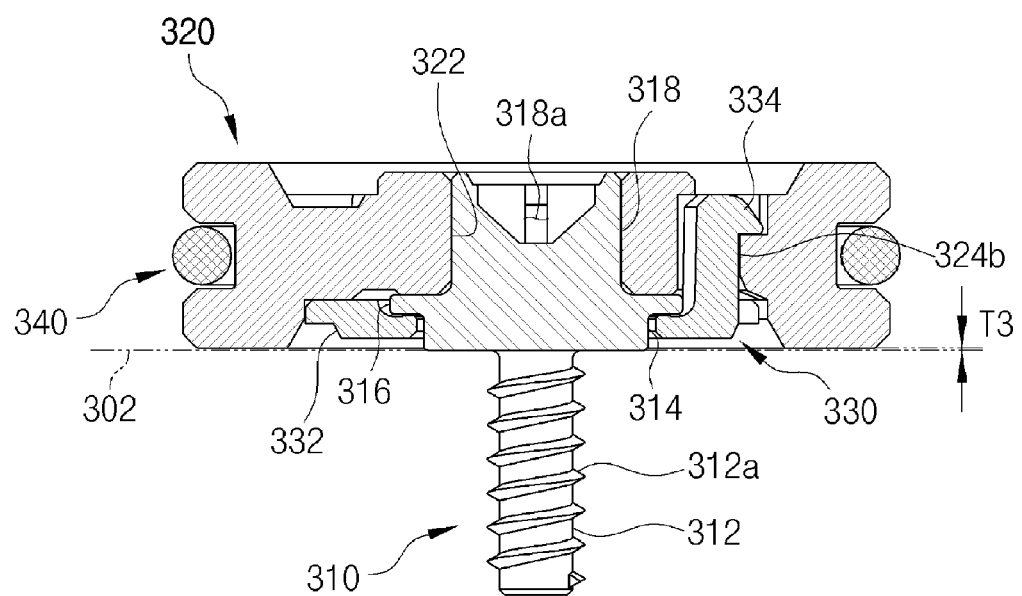
FIG. 12 is a cross-sectional view taken along line E-E of FIG. 11.
Figure 13:
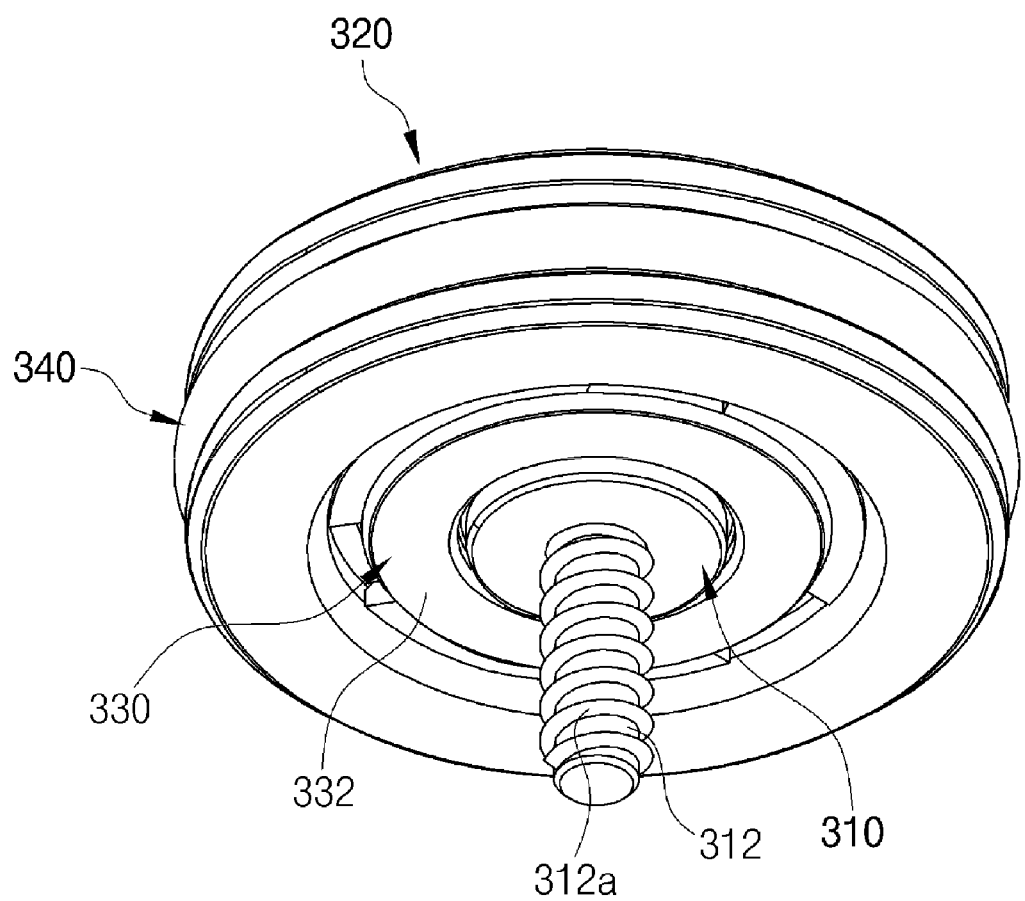
FIG. 13 is a perspective bottom view showing the roller unit having an integrated roller unit according to the third embodiment of the present invention.
Figure 14:
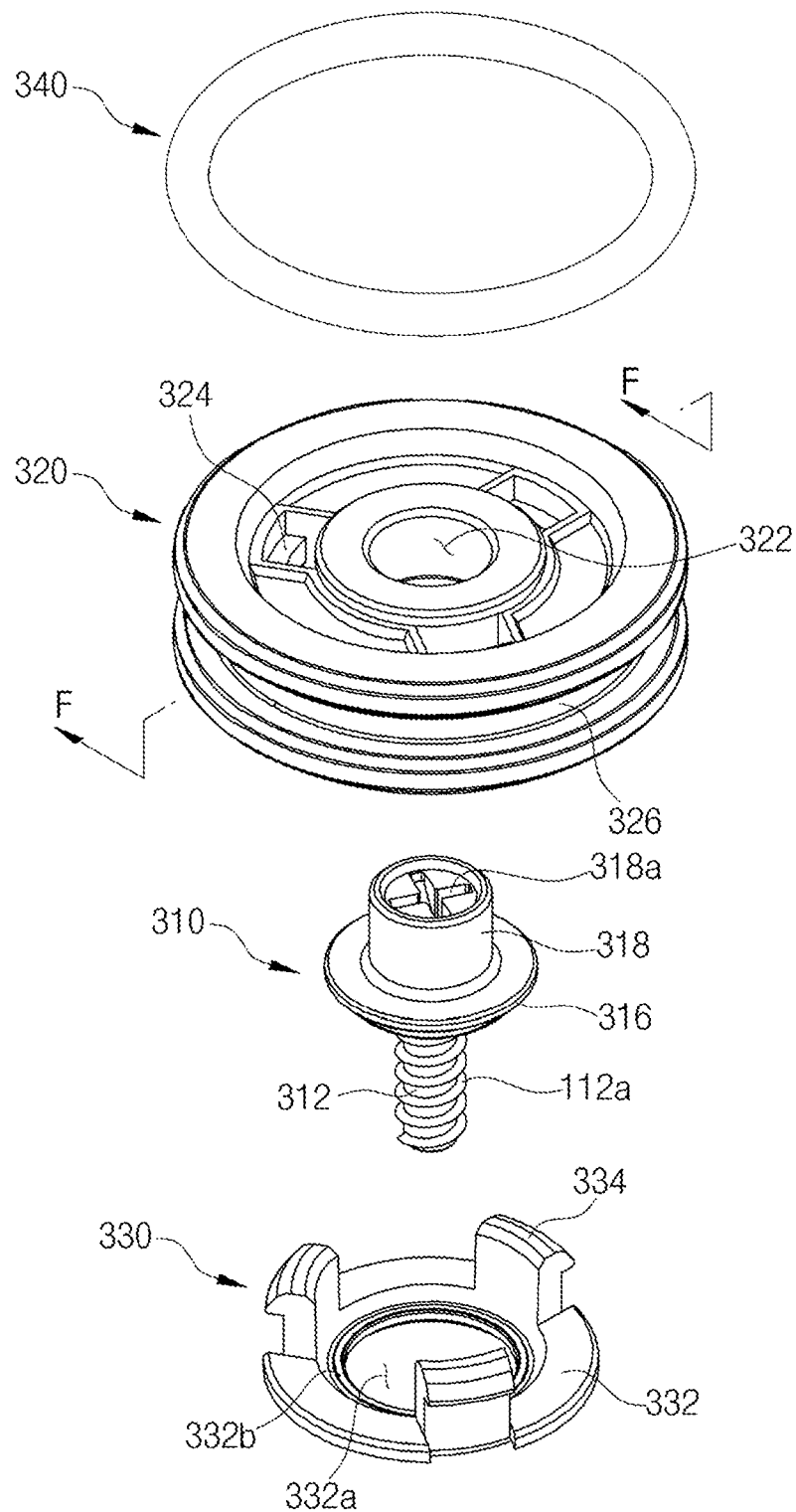
FIG. 14 is an exploded perspective view showing the roller unit having an integrated roller unit according to the third embodiment of the present invention.
Figure 15:
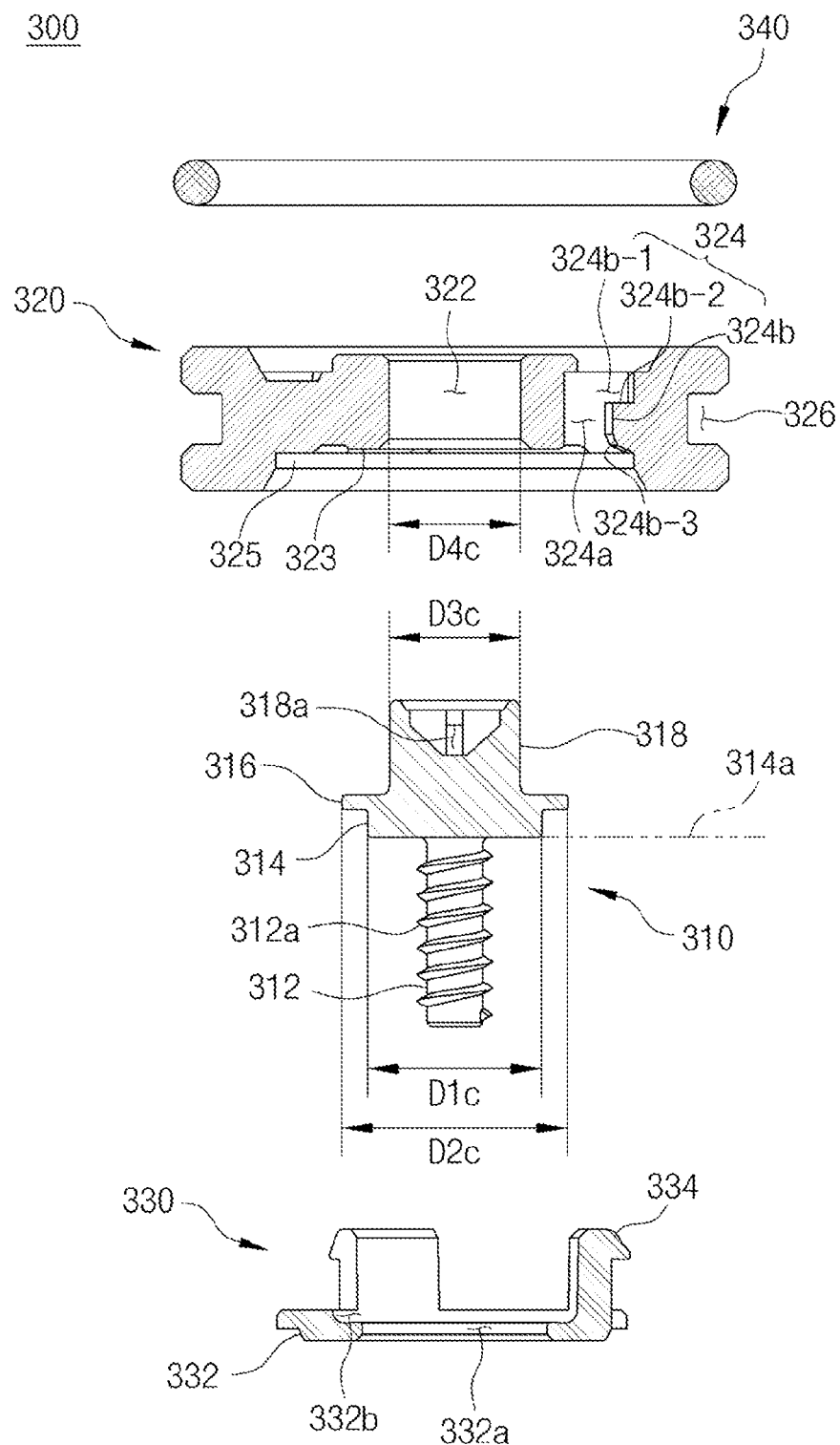
FIG. 15 is a cross-sectional view taken along line F-F of FIG. 14.
Figure 16:
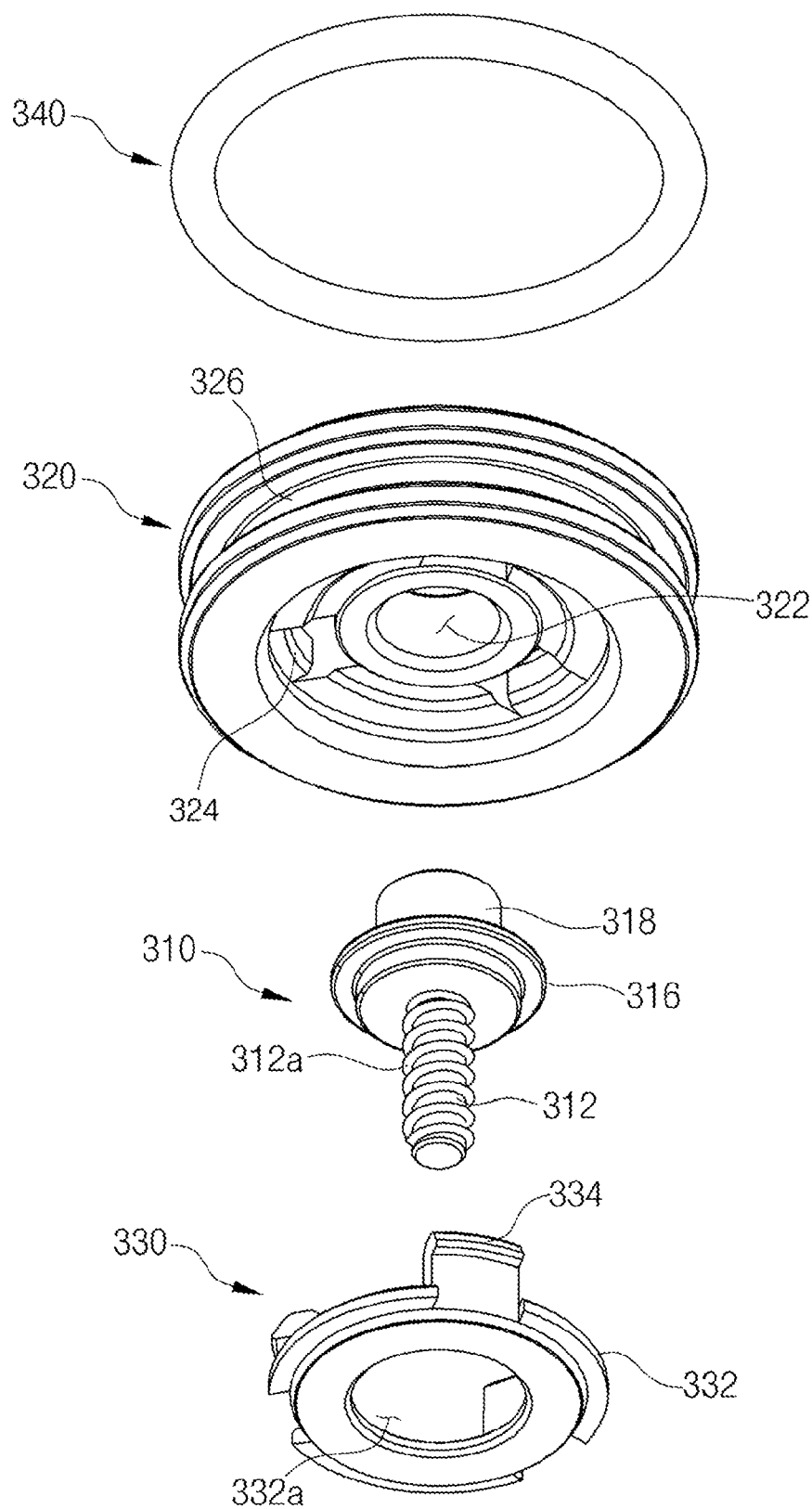
FIG. 16 is a perspective bottom view of FIG. 14.

Hereinafter, the present invention will be described in detail with reference to the accompanying drawings showing embodiments of the present invention for those skilled in the art to easily achieve the present invention. Unless specifically defined, terminologies used herein have the same meanings as corresponding terminologies that those skilled in the art understand. If the meanings of terminologies used herein conflict with common meanings of corresponding terminologies, they follow the definition made herein, and like reference numerals used herein indicate the same components.

Further, a roller unit having an integrated fastening portion disclosed herein can be achieved in various embodiments, but it should be understood that the roller unit having an integrated fastening portion is not limited to the embodiments.

First Embodiment

A roller unit 100 having an integrated fastening portion according to a first embodiment of the present invention includes: a support shaft 110 having first and second flanges 112 and 114 fastened to a containing body or a containing main body (hereafter, referred to as a mounting structure); a rotating body 120 rotatably coupled to a side of the support shaft 110; and a washer 130 surrounding the second flange 114 and coupled to a side of the rotating body 120.

The mounting structure 102, which means a containing body for keeping for use necessary articles or a containing main body for accommodating the containing body, can be applied to various products such as furniture or a refrigerator.

The supporting shaft 110 has the first and second flanges 112 and 114 that are stepped and is fastened to the mounting structure 102 such as furniture of a refrigerator.

The supporting shaft 110 has a fastening portion 111, the first flange 112 formed at a side of the fastening portion 111, a second flange 114 having a larger outer diameter than the first flange 112, and a supporting portion 116 protruding at a side of the second flange 114.

The fastening portion 111 extends a predetermined length and is fastened to the mounting structure 102.

The fastening portion 111 can be fastened in a thread-fastening type by forming a thread 111a longitudinally around the outer side, or may be fastened in various ways such as forcible fitting.

A contact surface 112a that is in close contact with the mounting structure 102 is formed at the side, which faces the mounting structure 102, of the first flange 112.

The contact surface 112a may be formed in a shape corresponding to the mounting structure 102 that the contact surface 112a faces.

For example, when the portion of the mounting structure 102 that the contact surface 112 faces is flat, the contact surface 112a is made flat, and when it is uneven, the contact surface 112a is also made uneven for close contact to prevent the thread-fastened fastening portion 111 from loosening.

The second flange 114 is formed on one body with the first flange 112, but may have an outer diameter different from that of the first flange 112.

For example, the second flange 114 is formed to have an outer diameter D2a larger than the diameter D1a of the first flange 112.

The reason of making the outer diameter D2a of the second flange 114 larger than the outer diameter D1a of the first flange 112 is for coupling the supporting shaft 110 to the rotating body 120 through a fixing portion 136 of the washer 130 with the second flange 114 therebetween unlike the first flange 112 being in contact with the mounting structure 102.

The supporting portion 116 protrudes toward the rotating body 120, at a side of the second flange 114.

The outer diameter D3a of the supporting portion 116 is made a little smaller than the inner diameter D4a of a hollow portion 121 of the rotating body 120 so that the supporting portion 116 can be easily inserted into the hollow portion 121.

The outer side of the supporting portion 116 has a shape corresponding to the shape of the hollow portion 121 of the rotating body 120.

An end of the support portion 116 may be chamfered to be smoothly inserted into the hollow portion 121 of the rotating body 120.

A tool groove 116a may be formed at the end of the supporting portion 116 in various shapes such as "+", "−", and "★" corresponding to fastening tools so that the roller unit 100 can be easily and conveniently fastened to the mounting structure 102 by the fastening tools.

The rotating body 120 is rotatably coupled to a side of the supporting shaft 110 and has the hollow portion 121, a supporting step 122 formed outside the end of the hollow portion 121, and a fixing groove 123 formed at the supporting step 122.

The hollow portion 121 is formed axially through the center of the rotating body 120 so that the supporting shaft 110 is inserted therein.

The supporting step 122 is disposed outside the end of the hollow portion 121 in the insertion direction of the supporting shaft 110 and supports the side, which faces the hollow portion 121, of the second flange 114.

The fixing groove 123 is recessed in the insertion direction of the supporting shaft 110 on a side of the supporting step 122 and fixes the washer 130.

The inner diameter D5a of the fixing groove 123 may be made larger than the inner diameter D6a of an opening 124 to prevent an inserting protrusion 132 of the washer 130 from separating outside.

A reinforcing groove 125 recessed toward the hollow portion 121 may be further formed around the outer side of the rotating body 120 having this configuration.

The reinforcing groove 125 has a ring-shaped cross-section and a ring-shaped reinforcing member 126 is seated in the reinforcing groove 125.

The reinforcing member 126 may be made of urethane that can prevent sliding and noise in a rotational motion.

The washer 130, which has a hole at the center and surrounds the second flange 114, is coupled to a side of the rotating body 120 and retains the supporting shaft 110 and the rotating body 120 to prevent separation of them.

The washer 130 has an insertion protrusion 132 fitted in the fixing groove 123, a supporting protrusion 134 protruding outward close to the insertion protrusion 132, and a fixing portion 136 formed opposite to the supporting protrusion 134.

The insertion protrusion 132 protrudes toward the rotating body 120, has a shape corresponding to the fixing groove 123, and is fitted in the fixing groove 123.

The supporting protrusion 134 protrudes outward close to the insertion protrusion 132, and a side of the supporting protrusion 134 which faces the rotating body 120 is in contact with the supporting step 122 when the insertion protrusion 132 is fitted in the fixing groove 123.

The fixing portion 136 has a fixing protrusion 136a bending inward toward the hollow portion 121 at the opposite side to the supporting protrusion 134.

The fixing protrusion 136a forms a receiving groove 136b for fixing the second flange 114 therein by bending toward the hollow portion 121.

For example, in order to fit the insertion protrusion 132 of the washer 130 in the fixing groove 123 of the rotating body 120, the fixing protrusion 136a forms the substantially U-shaped receiving groove 136b between the fixing protrusion and the supporting step 122 of the rotating body 120, whereby the second flange 114 is fixed in the receiving groove 136b.

Accordingly, separation of the supporting shaft 110 and the rotating body 120 coupled by the washer 130 can be prevented.

In order to fit the second flange 114 of the supporting shaft 110 in the receiving groove 136b of the fixing protrusion 136a of the washer 130, an end 120a of the rotating body 120 and an end of the first flange 112 are spaced at a predetermined gap T1 from each other so that the rotating body 120 can smoothly rotate without interference by the mounting structure 102 such as a containing body or a containing main body.

A process of assembling the roller unit 100 having an integrated fastening portion according to the first embodiment of the present invention is described hereafter.

First, the supporting shaft 110 and the rotating body 120, which are mounted on the mounting structure 102 such as a containing body or a containing main body and can be combined in an integrated unit to reduce friction resistance by changing sliding friction into rolling friction while the containing body is opened and closed, are prepared.

The supporting portion 116 protruding at a side of the second flange 114 of the supporting shaft 110 is placed parallel with the hollow portion 121 of the rotating body 120 to be inserted therein in order to combine the supporting shaft 110 and the rotating body 120.

As described above, with the supporting portion 116 of the supporting shaft 110 and the hollow portion 121 of the rotating body 120 arranged in parallel with each other, by inserting the supporting shaft 110 into the rotating body 120, the supporting portion 116 of the supporting shaft 110 can be fitted in the hollow portion 121 of the rotating body 120.

After the supporting portion 116 of the supporting shaft 110 is fitted in the hollow portion 121 of the rotating body 120, the supporting shaft 110 and the rotating body 120 is coupled by the washer 130.

In this process, a side of the second flange 114 of the supporting shaft 110 is brought in contact with the supporting step 122 of the rotating body 120, the second flange 114 of the supporting shaft 110 is inserted into the receiving groove 136b formed by the fixing protrusion 136a of the washer 130, and the insertion protrusion 132 is fitted into the fixing groove 123 of the rotating body 120.

The insertion protrusion 132 of the washer 130 may be forcibly fitted into the fixing groove 123 of the rotating body 120 by a pushing device and can be firmly fixed without separating by the insertion protrusion 132 having a shape corresponding to the inner diameter D5a of the fixing groove 123 that is larger than the inner diameter D6a of the opening 124.

By this process, the roller unit 100 having an integrated fastening portion according to the first embodiment of the present invention can be fastened to the mounting structure 102 to be used by inserting a fastening tool into the tool groove 116a and then turning the supporting shaft 110 for thread-fastening.

The roller unit 100 having an integrated fastening portion according to the first embodiment of the present invention includes: the supporting shaft 110 having the first and second flanges 112 and 114 formed in multi steps with different outer diameters to be fastened to a containing body or a containing main body that can slide; the rotating body 120 rotatably coupled to a side of the supporting shaft 110; and the washer 130 surrounding and fixing the second flange 114, coupled to a side of the rotating body 120, and preventing separation of the supporting shaft 110 and the rotating body 120. Therefore, it is possible to more conveniently combine the supporting shaft 110 and the rotating body 120 and prevent separation of the supporting shaft 110 and the rotating body 120, whereby it is possible to improve various functions.

Second Embodiment

A roller unit 200 having an integrated fastening portion according to a second embodiment of the present invention includes: a support shaft 210 having first and second flanges 214 and 216 fastened to a containing body or a containing main body (hereafter, referred to as a mounting structure); and a rotating body 220 having fixing portions 226 surrounding the second flange 216 of the supporting shaft 210.

The mounting structure 202, which means a containing body for keeping for use necessary articles or a containing main body for accommodating the containing body, can be applied to various products such as furniture or a refrigerator.

The supporting shaft 210 has the first and second flanges 214 and 216 that are stepped and is fastened to the mounting structure 202 such as furniture or a refrigerator.

The supporting shaft 210 has a fastening portion 212, the first flange 214 formed at a side of the fastening portion 212, a second flange 216 having a larger outer diameter than the first flange 214, and a supporting portion 218 protruding at a side of the second flange 216.

The fastening portion 212 extends a predetermined length and is fastened to the mounting structure 202.

The fastening portion 212 can be fastened in a thread-fastening type by forming a thread 212a longitudinally around the outer side, or may be fastened in various ways such as forcible fitting.

A contact surface 214a that is in close contact with the mounting structure 202 is formed at the side, which faces the mounting structure 202, of the first flange 214.

The contact surface 214a may be formed in a shape corresponding to the mounting structure 202 that the contact surface 214a faces.

For example, when the portion of the mounting structure 202 that the contact surface 212 faces is flat, the contact surface 214a is made flat, and when it is uneven, the contact surface 214a is also made uneven for close contact to prevent the thread-fastened fastening portion 212 from loosening.

The second flange 216 is formed on one body with the first flange 214, but may have an outer diameter different from that of the first flange 214.

For example, the second flange 216 is formed to have an outer diameter D2b larger than the diameter D1b of the first flange 214.

The reason of making the outer diameter D2b of the second flange 216 larger than the outer diameter D1b of the first flange 214 is for coupling the supporting shaft 210 to the rotating body 220 through the fixing portions 226 with the second flange 216 therebetween unlike the first flange 214 being in contact with the mounting structure 202.

The supporting portion 218 protrudes toward the rotating body 220, at a side of the second flange 216.

The outer diameter D3b of the supporting portion 218 is made a little smaller than the inner diameter D4b of a hollow portion 220 of the rotating body 222 so that the supporting portion 218 can be easily inserted into the hollow portion 222.

The outer side of the supporting portion 218 has a shape corresponding to the shape of the hollow portion 222 of the rotating body 220.

An end of the support portion 218 may be chamfered to be smoothly inserted into the hollow portion 222 of the rotating body 220.

A tool groove 218a may be formed at the end of the supporting portion 218 in various shapes such as "+", "−", and "★" corresponding to fastening tools so that the roller unit 200 can be easily and conveniently fastened to the mounting structure 202 by the fastening tools.

The rotating body 220 has the hollow portion 222, the supporting step 224 formed outside an end of the hollow portion 222, and the fixing portions 226 formed around the hollow portion 222 to receive and fix the second flange 216.

The hollow portion 222 is formed through the center of the rotating body 220 so that the supporting shaft 210 is inserted therein.

The supporting step 224 is disposed outside the end of the hollow portion 222 in the insertion direction of the supporting shaft 210 and supports the side, which faces the hollow portion 222, of the second flange 216.

The fixing portions 226 formed around the hollow portion 222 are ramified with a predetermined gap therebetween.

A fixing protrusion 227 bending toward the hollow portion 222 is formed at an end of each of the fixing portion 226.

The fixing protrusions 227 form receiving grooves 227a for fixing the second flange 216 therein by bending toward the hollow portion 222. The fixing protrusions 227 may be formed on all the separate fixing portions 226 or may be alternately formed only some of the fixing portions 226.

Further, the cut grooves 227b may be formed at sides of the fixing portions 226 with regular intervals for elastic transformation of the fixing protrusions 227 when the rotating body 220 and the supporting shaft 210 are combined.

In order to fit the second flange 216 of the supporting shaft 210 in the receiving grooves 227a of the fixing protrusions 227a of the rotating body 220, an end 221 of the rotating body 220 and an end 214b of the first flange 214 are spaced at a predetermined gap T1 from each other so that the rotating body 220 can smoothly rotate without interference by the mounting structure 202 such as a containing body or a containing main body.

A reinforcing groove 228 recessed toward the hollow portion 220 is formed around the outer side of the rotating body 222 having this configuration.

The reinforcing groove 228 has a ring-shaped cross-section and a ring-shaped reinforcing member 229 is seated in the reinforcing groove 228.

The reinforcing member 229 may be made of urethane that can prevent sliding and noise in a rotational motion.

A process of assembling the roller unit 200 having an integrated fastening portion according to the second embodiment of the present invention is described hereafter.

First, the supporting shaft 210 and the rotating body 220, which are mounted on the mounting structure 202 such as a containing body or a containing main body and can be combined in an integrated unit to reduce friction resistance by changing sliding friction into rolling friction while the containing body is opened and closed, are prepared.

The supporting portion 218 protruding at a side of the second flange 216 of the supporting shaft 210 is placed parallel with the hollow portion 222 of the rotating body 220 to be inserted therein in order to combine the supporting shaft 210 and the rotating body 222 by forcible fitting.

As described above, with the supporting portion 218 of the supporting shaft 210 and the hollow portion 222 of the rotating body 220 arranged in parallel with each other, by inserting the supporting shaft 210 into the rotating body 220, the supporting portion 218 of the supporting shaft 210 can be fitted in the hollow portion 222 of the rotating body 220 by a pushing device etc.

In this process, the second flange 216 of the supporting shaft 210 gradually moves to the hollow portion 222 in contact with the fixing protrusions 227 and the fixing protrusions 227 are elastically transformed and opened outward by the cut grooves 227b, whereby a space in which the second flange 216 is inserted can be ensured.

That is, the second flange 216 is fitted into the receiving grooves 227a through the space ensured by elastic transformation of the fixing protrusions 227.

When the supporting portion 218 of the supporting shaft 210 is inserted in the hollow portion 222 of the rotating body 220, the second flange 216 having a larger outer diameter than the first flange 214 is positioned in the receiving grooves 227a formed by the fixing protrusions 227.

When the second flange 216 of the supporting shaft 210 is inserted in the receiving grooves 227a of the rotating body 220, the fixing protrusions 227a that have been elastically opened by movement interference by the second flange 216 are returned to the initial positions, thereby firmly fixing the second flange 216.

By this process, the roller unit 200 having an integrated fastening portion according to the second embodiment of the present invention can be fastened to the mounting structure 202 to be used by inserting a fastening tool into the tool groove 218a and then turning the supporting shaft 210 for thread-fastening.

The roller unit 200 having an integrated fastening portion according to the second embodiment of the present invention includes: the supporting shaft 210 having the first and second flanges 214 and 216 formed in multi steps with different outer diameters to be fastened to a containing body or a containing main body that can slide; and the rotating body 220 having the fixing portions 216 surrounding the second flange 216 of the supporting shaft 210. Therefore, it is possible to more conveniently combine the supporting shaft 210 and the rotating body 220 and prevent separation of the supporting shaft 210 and the rotating body 220, whereby it is possible to improve various functions.

Third Embodiment

A roller unit 300 having an integrated fastening portion according to a third embodiment of the present invention includes: a support shaft 310 having first and second flanges 314 and 316 fastened to a containing body or a containing main body (hereafter, referred to as a mounting structure); a roller 320 rotatably coupled to a side of the support shaft 310; and a fixing body 330 coupled to a side of the roller 320 and retaining the supporting shaft 310 and the roller 320 by being coupled to coupling portions 324 by coupling protrusions 334.

The mounting structure 302, which means a containing body for keeping for use necessary articles or a containing main body for accommodating the containing body, can be applied to various products such as furniture or a refrigerator.

The supporting shaft 310 has the first and second flanges 314 and 316 that are stepped with different outer diameters, and is fastened to the mounting structure 302 such as furniture of a refrigerator.

The supporting shaft 310 has a fastening portion 312, the first flange 314 formed at a side of the fastening portion 312, a second flange 316 having a larger outer diameter than the first flange 314, and a supporting portion 318 protruding at a side of the second flange 316.

The fastening portion 312 extends a predetermined length and is fastened to the mounting structure 302.

The fastening portion 312 can be fastened to the mounting structure 302 in a thread-fastening type by forming a thread 312a longitudinally around the outer side of the fastening portion 312, or may be fastened in various ways such as forcible fitting. A contact surface 314a that is in close contact with the mounting structure 302 is formed at the side, which faces the mounting structure 302, of the first flange 314.

The contact surface 314a may be formed in a shape corresponding to the mounting structure 302 that the contact surface 314a faces.

For example, when the portion of the mounting structure 302 that the contact surface 314a faces is flat, the contact surface 314a is made flat, and when it is uneven, the contact surface 314a is also made uneven for close contact, whereby it is possible to prevent the thread-fastened fastening portion 312 from loosening.

The second flange 316 is formed on one body with the first flange 314, but may have a larger outer diameter than the first flange 314.

The reason of making the outer diameter D2c of the second flange 316 larger than the outer diameter D1c of the first flange 314 is for coupling the supporting shaft 310 to the roller 320 through the fixing body coupled to the coupling portion 324 with a surface of the second flange 316 in contact with the supporting step 323 of the roller 320.

The supporting portion 318 protrudes toward the roller 320, at a side of the second flange 316.

The outer diameter D3c of the supporting portion 318 is made a little smaller than the inner diameter D4c of a hollow portion 322 of the roller 320 so that the supporting portion 318 can be easily inserted into the hollow portion 322.

The outer side of the supporting portion 318 has a shape corresponding to the shape of the hollow portion 322 of the roller 320.

An end of the support portion 318 may be chamfered to be smoothly inserted into the hollow portion 322 of the roller 320.

A tool groove 318a may be formed at the end of the supporting portion 318 in various shapes such as "+", "−", and "★" corresponding to fastening tools so that the roller unit 300 can be easily and conveniently fastened to the mounting structure 302 by the fastening tools.

The roller 320 has the hollow portion 322, the supporting step 323 formed outside the end of the hollow portion 322, and the fixing portion 324 formed outside the hollow portion and fixing the fixing body 330.

The hollow portion 322 is formed through the center of the roller 320 so that the supporting shaft 310 is inserted therein.

The supporting step 323 is disposed outside the end of the hollow portion 322 in the insertion direction of the supporting shaft 310 and supports the side, which faces the hollow portion 322, of the second flange 316.

The coupling portion 324 is formed outside the hollow portion 322 and prevents separation of the roller 320 and the supporting shaft 310 by being coupled to the fixing body 330.

The coupling portion 324 has coupling holes 324a circumferentially arranged and fixing protrusions 324b protruding inward in the coupling holes 324a.

The invention claimed is:

1. A roller unit comprising:
 a supporting shaft comprising:
  a first flange formed on the fastening portion;
  a second flange formed on the first flange and having an outer diameter larger than an outer diameter of the first flange;
  a fastening portion formed in a downward direction below the first flange; and a supporting portion formed on the second flange in an upward direction opposite to the fastening portion;

a rotating body rotatably coupled to the supporting shaft and having a fixing groove recessed in the upward direction and a hollow portion in a center of the rotating body through which the supporting portion is inserted; and a washer on which the rolling body and the second flange seat, the washer having an insertion protrusion protruding in the upward direction and fitted in the fixing groove to be coupled with the rolling body, thereby preventing separation of the supporting shaft and the rotating body by retaining the supporting shaft and the rotating body.

2. The roller unit of claim 1, wherein the first flange and the second flange are formed in a single body; and the supporting portion has an outer diameter less than the outer diameter of the second flange.

3. The roller unit of claim 2, wherein a tool groove is further formed at an end of the supporting portion.

4. The roller unit of claim 1, wherein the rotating body comprises:

the hollow portion formed through the center of the rotating body;

a supporting step seating on the second flange; and a fixing groove formed at the supporting step and recessed in the coupling direction of the supporting shaft to fix the washer.

5. The roller unit of claim 1, further comprising a ring-shaped reinforcing member for preventing sliding and noise, wherein the rotating body has a reinforcing groove formed around an outer side of the rotating body, and the reinforcing member is inserted into the reinforcing groove.

6. The roller unit of claim 4, wherein the washer comprises:

the insertion protrusion fitted in the fixing groove;

a supporting protrusion protruding outward close to the insertion protrusion and having a surface facing the rotating body, the surface of the supporting protrusion being in contact with the supporting step; and a fixing protrusion protruding inwardly toward the hollow portion at an opposite side to the supporting protrusion, wherein the second flange is positioned between the supporting step and the fixing protrusion.

7. A roller unit comprising:

a supporting shaft comprising:

a first flange formed on the fastening portion;

a second flange formed on the first flange and having an outer diameter larger than an outer diameter of the first flange, and a supporting portion formed on the second flange in a direction opposite to the fastening portion;

a fastening portion formed in a downward direction below the first flange; and a supporting portion formed on the second flange in an upward direction opposite to the fastening portion; and a rotating body rotatably coupled to the supporting shaft and having a fixing portion surrounding the second flange of the supporting shaft and a hollow portion in a center of the rotating body through which the supporting portion is inserted, the fixing portion having a fixing protrusion bending toward the hollow portion at an end, wherein the second flange seats on the fixing protrusion.

8. The roller unit of claim 7, wherein the supporting shaft comprises:

the first flange and the second flange are formed in a single body; and the supporting portion has an outer diameter less than the outer diameter of the second flange.

9. The roller unit of claim 8, wherein a tool groove is further formed at an end of the supporting portion.

10. The roller unit of claim 7, wherein the rotating body comprises:

the hollow portion formed through the center of the rotating body;

a supporting step seating on the second flange; and the fixing portion comprising a plurality of fixing portions arranged around the hollow portion, ramified with regular intervals, and having the fixing protrusion forming a receiving groove between the supporting step and the fixing protrusion, wherein the second flange is positioned in the receiving groove between the supporting step and the fixing protrusion.

11. The roller unit of claim 10, wherein the fixing portions further comprise a cut groove for elastic transformation of the fixing protrusions when the rotating body is combined with the supporting shaft.

12. The roller unit of claim 10, wherein the fixing protrusions are alternately formed at the fixing portions of the rotating body.

13. The roller unit of claim 7, further comprising a ring-shaped reinforcing member, wherein the rotating body has a reinforcing groove formed around an outer side of the rotating body, and the reinforcing member is inserted into the reinforcing groove.

14. A roller unit comprising:

a supporting shaft comprising:

a first flange formed on the fastening portion;

a second flange formed on the first flange and having an outer diameter larger than an outer diameter of the first flange;

a fastening portion formed in a downward direction below the first flange; and a supporting portion formed on the second flange in an upward direction opposite to the fastening portion;

a roller rotatably coupled to the supporting shaft and having coupling portions formed in a fastening direction with regular intervals therein, the roller having a hollow portion in a center of the roller through which the supporting portion is inserted; and a fixing body coupled to the roller to surround and fix the second flange of the supporting shaft, the fixing body having coupling protrusions protruding in the upward direction at positions corresponding to the coupling portions to be inserted into the coupling portions, thereby retaining the supporting shaft and the roller.

15. The roller unit of claim 14, wherein the supporting shaft comprises:

the fastening portion having a thread around an outer side;

the first flange and the second flange are formed in a single body; and the supporting portion has an outer diameter less than the outer diameter of the second flange.

16. The roller unit of claim 15, wherein a tool groove is further formed at an end of the supporting portion.

17. The roller unit of claim 14, wherein the roller comprises:
a hollow portion formed through a center of the roller;
a supporting step seating on the second flange; and
coupling portions comprising:
coupling holes arranged around the hollow portion, ramified with regular intervals, and receiving the coupling protrusions of the fixing body; and
fixing protrusions protruding inward in the coupling holes, providing a fixing space for the coupling protrusions of the fixing body inserted in the coupling holes, having a fixing step preventing separation of the coupling protrusions and an inclined coupling guide curvedly formed at an end in a coupling direction of the supporting shaft and guiding the coupling protrusions to be coupled.

18. The roller unit of claim 17, wherein the fixing body comprises:
a flange supporting portion having a flange hole formed at a center thereon and receiving the first flange of the supporting shaft, and a flange seat recessed on a side of the flange hole so that the second flange of the supporting shaft is seated therein; and
the coupling protrusions formed on a surface, which faces the roller, of the flange supporting portion, the coupling protrusions each inserted into each of the coupling holes of the roller, the coupling protrusions each locked by the fixing step in the coupling holes of the roller, thereby retaining the roller and the supporting shaft.

19. The roller unit of claim 17, further comprising
a ring-shaped rotation-assistant member,
wherein the roller has a fitting groove formed around an outer side of the roller, and the rotation-assistant member is fitted in the fitting groove.

* * * * *